(12) United States Patent
Ninagawa

(10) Patent No.: US 11,756,348 B2
(45) Date of Patent: *Sep. 12, 2023

(54) ON-VEHICLE DATA MANAGEMENT DEVICE AND METHOD

(71) Applicant: TOYOTA JIDOSHA KABUSHIKI KAISHA, Toyota (JP)

(72) Inventor: Yuji Ninagawa, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

This patent is subject to a terminal disclaimer.

(21) Appl. No.: 17/231,549

(22) Filed: Apr. 15, 2021

(65) Prior Publication Data

US 2021/0233334 A1    Jul. 29, 2021

Related U.S. Application Data

(63) Continuation of application No. 16/277,588, filed on Feb. 15, 2019, now Pat. No. 11,010,990.

(30) Foreign Application Priority Data

Apr. 11, 2018   (JP) .................. 2018-076138

(51) Int. Cl.
*G07C 5/00* (2006.01)
*G07C 5/02* (2006.01)
(Continued)

(52) U.S. Cl.
CPC ............. *G07C 5/02* (2013.01); *G01C 22/02* (2013.01); *H04N 23/64* (2023.01)

(58) Field of Classification Search
CPC ....... G07C 5/02; G01C 22/02; H04N 5/23222
(Continued)

(56) References Cited

U.S. PATENT DOCUMENTS

2012/0253587 A1* 10/2012 Davidson ........... G06Q 10/0631
701/29.3
2013/0030873 A1    1/2013 Davidson
(Continued)

FOREIGN PATENT DOCUMENTS

| CN | 103827900 A | 5/2014 |
| JP | 2001-304876 A | 10/2001 |

(Continued)

OTHER PUBLICATIONS

Oct. 28, 2020 Office Action issued in Office Action issued in U.S. Appl. No. 16/277,588.

(Continued)

*Primary Examiner* — Mahmoud S Ismail
(74) *Attorney, Agent, or Firm* — Oliff PLC

(57) ABSTRACT

This on-vehicle data management device includes: a data collection section configured to collect data that is obtained by a first apparatus of a vehicle and that is recorded in a record region provided in the first apparatus; an information obtaining section configured to obtain information related to travel of the vehicle from a second apparatus of the vehicle, the second apparatus being different from the first apparatus; and a storage processing section configured to store target data collected by the data collection section in association with the information related to travel of the vehicle obtained by the information obtaining section.

7 Claims, 2 Drawing Sheets

(51) Int. Cl.
*G01C 22/02* (2006.01)
*H04N 23/60* (2023.01)

(58) Field of Classification Search
USPC .......................................... 701/33.4
See application file for complete search history.

(56) References Cited

U.S. PATENT DOCUMENTS

2014/0350777 A1    11/2014  Kawai et al.
2015/0111603 A1*    4/2015  Rivard ............. G06Q 10/06311
                                                              455/456.3

FOREIGN PATENT DOCUMENTS

| | | |
|---|---|---|
| JP | 2012-221031 A | 11/2012 |
| JP | 2012-252713 A | 12/2012 |
| JP | 2014-191802 A | 10/2014 |
| JP | 2014-229228 A | 12/2014 |
| JP | 2016-152442 A | 8/2016 |

OTHER PUBLICATIONS

Mar. 3, 2021 Notice of Allowance issued in Office Action issued in U.S. Appl. No. 16/277,588.

* cited by examiner

ON-VEHICLE DATA MANAGEMENT DEVICE AND METHOD

CROSS-REFERENCE TO RELATED APPLICATION(S)

This application is a continuation of U.S. application Ser. No. 16/277,588 filed Feb. 15, 2019, which is based on and claims priority under 35 U.S.C. 119 from Japanese Patent Application No. 2018-076138 filed on Apr. 11, 2018. The contents of the above applications are incorporated herein by reference.

BACKGROUND OF THE INVENTION

Field of the Invention

The present invention relates to an on-vehicle data management device to be mounted on a vehicle to which a plurality of apparatuses are connected via a network, and relates to a method performed by the device.

Description of the Background Art

It is a common practice that, in a vehicle, various data (for example, images taken by an on-vehicle camera, and vehicle states such as the vehicle speed and whether or not the brake is stepped on) obtained by a plurality of apparatuses mounted on the vehicle are recorded and collected, to be utilized later in analysis.

Patent Literature 1 (Japanese Laid-Open Patent Publication No. 2001-304876) discloses a technology in which images of the vicinity of a vehicle taken by an on-vehicle camera are stored together with position information and time information, and such information is utilized later when the images are analyzed.

In the method disclosed in Patent Literature 1, clues that can be used when analyzing stored images are only the position information and the time information, and thus, the traveling state of the vehicle is unknown. Therefore, there is room for improvement in efficient search and extraction of the images.

SUMMARY OF THE INVENTION

The present invention has been made in view of the above problem. An object of the present invention is to provide an on-vehicle data management device and a method that can efficiently utilize various data obtained by apparatuses.

In order to solve the above problem, an aspect of the present invention is an on-vehicle data management device including: a data collection section configured to collect data that is obtained by a first apparatus of a vehicle and that is recorded in a record region provided in the first apparatus; an information obtaining section configured to obtain information related to travel of the vehicle from a second apparatus of the vehicle, the second apparatus being different from the first apparatus; and a storage processing section configured to store target data collected by the data collection section in association with the information related to travel of the vehicle obtained by the information obtaining section.

According to this aspect, the on-vehicle data management device collects data from the record region, of the first apparatus, in which the obtained data is recorded; and stores this collected target data in association with information related to travel of the vehicle. Accordingly, if the storage processing section of the on-vehicle data management device is searched using the information related to travel of the vehicle as a key, desired target data can be extracted, and thus, data can be efficiently utilized. In addition, since the first apparatus need not obtain the information related to travel of the vehicle and need not associate the obtained information with the target data, the existing apparatus can be used without performing update or the like of programs.

In the above aspect, the storage processing section may store the target data in association with information related to travel of the vehicle, on the basis of a date and a time of recording of the target data and a date and a time of obtainment of the information related to travel of the vehicle. Accordingly, the target data can be easily associated with the information related to travel of the vehicle.

In the above aspect, the information related to travel of the vehicle may be a total travel distance of the vehicle. The total travel distance of the vehicle may be embedded into a part of a file name of the target data. If such information is stored, it becomes easy to extract target data recorded for each certain travel distance interval, or to extract target data recorded during stop of the vehicle, for example.

In the above aspect, the first apparatus may delete, from the record region, the target data collected by the data collection section. Accordingly, a plurality of apparatuses can record many new pieces of data by the amount of the target data deleted from the region.

Another aspect of the present invention is a data management method performed by a computer device mounted on a vehicle, the data management method including: a collection step of collecting data that is obtained by a first apparatus of the vehicle and that is recorded in a record region provided in the first apparatus; an obtainment step of obtaining information related to travel of the vehicle from a second apparatus of the vehicle, the second apparatus being different from the first apparatus; and a step of storing target data collected in the collection step, into a storage section, in association with the information related to travel of the vehicle obtained in the obtainment step.

In the data management method according to this another aspect, data is collected from the first apparatus in which obtained data is recorded, and the collected target data is stored in association with information related to travel of the vehicle. Accordingly, desired target data can be extracted using the information related to travel of the vehicle as a search key, and thus, data can be efficiently utilized. In addition, since the first apparatus need not obtain information related to travel of the vehicle and need not associate the obtained information with the target data, the existing apparatus can be used without performing update or the like of programs.

Still another aspect of the present invention is a data structure of a data file in which on-vehicle data related to a vehicle is stored, the data structure including: data collected from a first on-vehicle apparatus mounted on the vehicle, wherein the collected data is associated with information related to travel of the vehicle obtained from a second on-vehicle apparatus different from the first on-vehicle apparatus.

If the data structure of the data file according to this another aspect is used, desired data can be extracted using the information related to travel of the vehicle as a search key, and thus, data can be efficiently utilized.

In the above aspect, the information related to travel of the vehicle may be a total travel distance of the vehicle. The total travel distance of the vehicle may be embedded into a part of a file name of the data. In addition, the collected data may include at least one of an image of a vicinity of the vehicle taken by a camera mounted on the vehicle, and data recorded in accordance with occurrence of a predetermined event.

According to the on-vehicle data management device and the method of the present invention, a huge amount of various data obtained by each of a plurality of apparatuses can be efficiently utilized.

These and other objects, features, aspects, and advantages of the present invention will become apparent from the following detailed description of the present invention when taken in conjunction with the accompanying drawings.

DESCRIPTION OF THE PREFERRED EMBODIMENTS

[Outline]

An on-vehicle data management device of the present invention collects data from a first apparatus of a vehicle and stores the collected target data in association with information related to travel of the vehicle. Accordingly, desired target data can be extracted, using the information related to travel of the vehicle as a search key, and thus, data can be efficiently utilized.

[Configuration]

Figure 1:
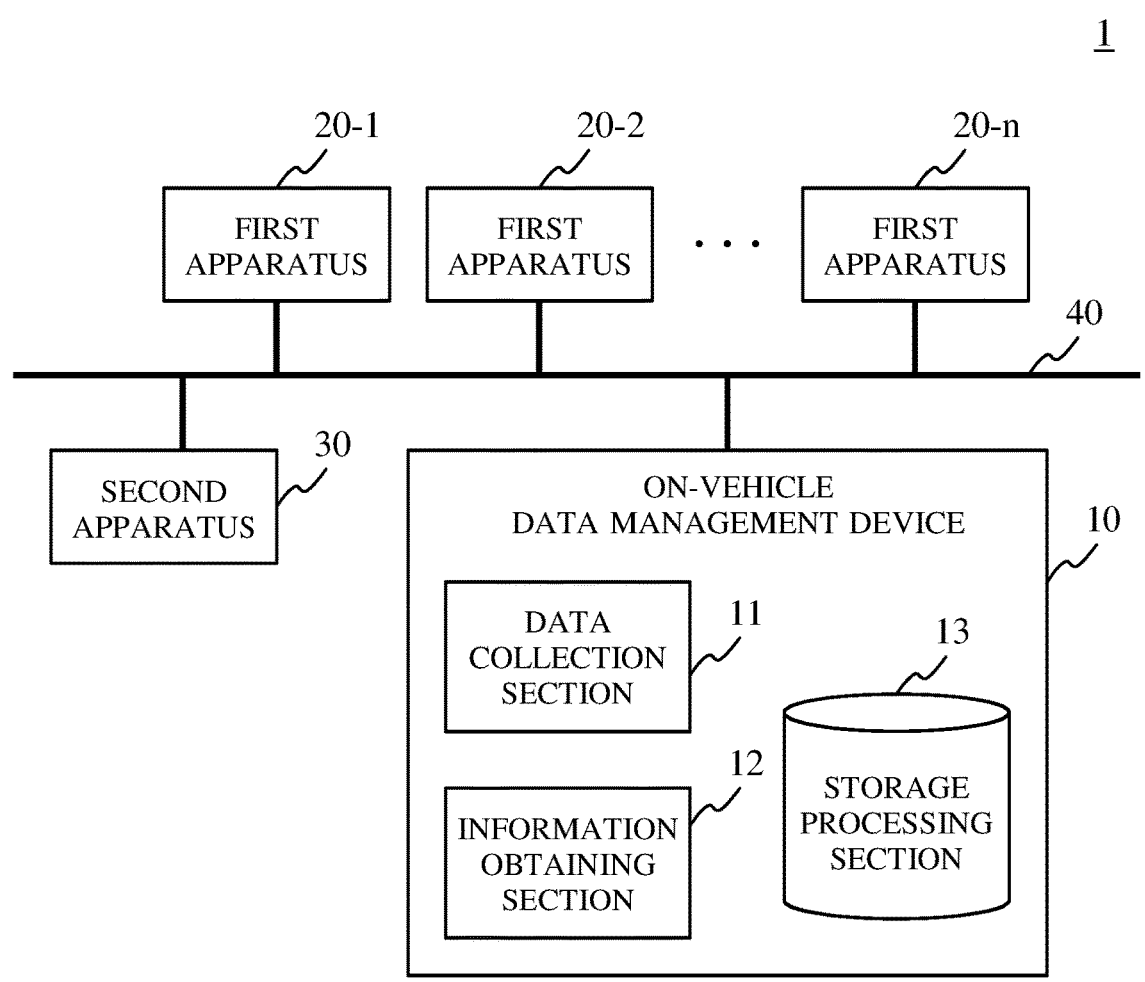
FIG. 1 is a diagram showing a schematic configuration of an on-vehicle network system including an on-vehicle data management device according to the present embodiment.

FIG. 1 is a diagram showing a schematic configuration of an on-vehicle network system 1 including an on-vehicle data management device 10 according to one embodiment of the present invention. The on-vehicle network system 1 shown as an example in FIG. 1 includes: the on-vehicle data management device 10; a plurality of first apparatuses 20-1 to 20-n (n is an integer not smaller than 2); and a second apparatus 30. The on-vehicle data management device 10, the first apparatuses 20-1 to 20-n, and the second apparatus 30 are connected so as to be communicable with one another via a network 40 such as a CAN (Controller Area Network), for example.

At least a part of the first apparatuses 20-1 to 20-n and the second apparatus 30 may be directly connected to the on-vehicle data management device 10 through dedicated wiring (direct wiring).

The first apparatuses 20-1 to 20-n are various electronic apparatuses mounted on the vehicle, such as a camera, a sensor, a switch, a communication apparatus, and an electronic control unit (ECU), for example. A part or all of the first apparatuses 20-1 to 20-n can each obtain predetermined data at least when an event determined in advance has occurred, change in the vehicle state has been detected, or the like; and can record the obtained data into a predetermined record region provided in each apparatus, together with information (hereinafter, referred to as "date and time") that can uniquely specify the year, the month, the date, and the time.

The second apparatus 30 is a sensor, an electronic control unit (ECU), or the like, for example, and can obtain predetermined information related to travel of the vehicle, together with date and time. The information related to travel of the vehicle is information serving as a search key to be used for efficient search and extraction of data, and can be set as desired in accordance with the purpose. For example, the following information can be set as the information related to travel of the vehicle.

The total travel distance which is the cumulative distance traveled by the vehicle The position of the vehicle In a case where the vehicle is a hybrid vehicle (HV, PHV), a travel mode indicating whether the vehicle is traveling in an EV travel mode or in an engine travel mode In a case where the vehicle has an automatic drive function, a drive mode indicating whether the vehicle is traveling in a manual drive mode or in an automatic drive mode In a case where the vehicle is traveling in the automatic drive mode, the level of automatic drive (1 to 4) being performed by the vehicle.

The on-vehicle data management device 10 enables efficient utilization of a huge amount of various data obtained and/or recorded by each of the first apparatuses 20-1 to 20-n. The on-vehicle data management device 10 includes a data collection section 11, an information obtaining section 12, and a storage processing section 13.

The data collection section 11 can collect predetermined data as a target (hereinafter, referred to as "target data"), from among a plurality of pieces of data obtained and/or recorded by each of the first apparatuses 20-1 to 20-n. The target data is data to be utilized in analysis after the target data is collected. The target data can be set as desired in accordance with the purpose. For example, a part or all of data that has information of recording time as below can be set as the target data.

Image of the vicinity of the vehicle taken by an on-vehicle camera

Data (diagnosis data, event data) recorded in accordance with occurrence of an event Control signal log or sensor data log recorded in a desired condition.

The data collection section 11 may collect, as the target data, data received from an apparatus of a facility (management center, or the like) outside the vehicle via the first apparatuses 20-1 to 20-n.

The information obtaining section 12 can obtain, together with date and time, predetermined information related to travel of the vehicle obtained by the second apparatus 30.

The storage processing section 13 stores, according to a data structure of a predetermined data file, the target data collected by the data collection section 11, in association with the information related to travel of the vehicle obtained by the information obtaining section 12. The association can be realized by embedding the information related to travel of the vehicle into the file name of the target data. Which information related to travel of the vehicle is to be associated with the target data can be determined on the basis of the matching degree or closeness in dates and times, for example. In order to exclude influences of time difference and the like, Global Positioning System Time or Coordinated Universal Time (UTC) is preferably employed for the date and time.

If information related to travel of the vehicle is available in the first apparatuses 20-1 to 20-n, the information obtaining section 12 may obtain the information related to travel of the vehicle from the first apparatuses 20-1 to 20-n, or the data collection section 11 may collect the target data and the information related to travel of the vehicle together.

The on-vehicle data management device 10 described above is typically configured as an electronic control unit (ECU) including a processor, a memory, an input/output interface, and the like. By the processor reading out and performing programs stored in the memory, predetermined functions described above can be realized.

[Example of Information Associating Process]

Figure 2:
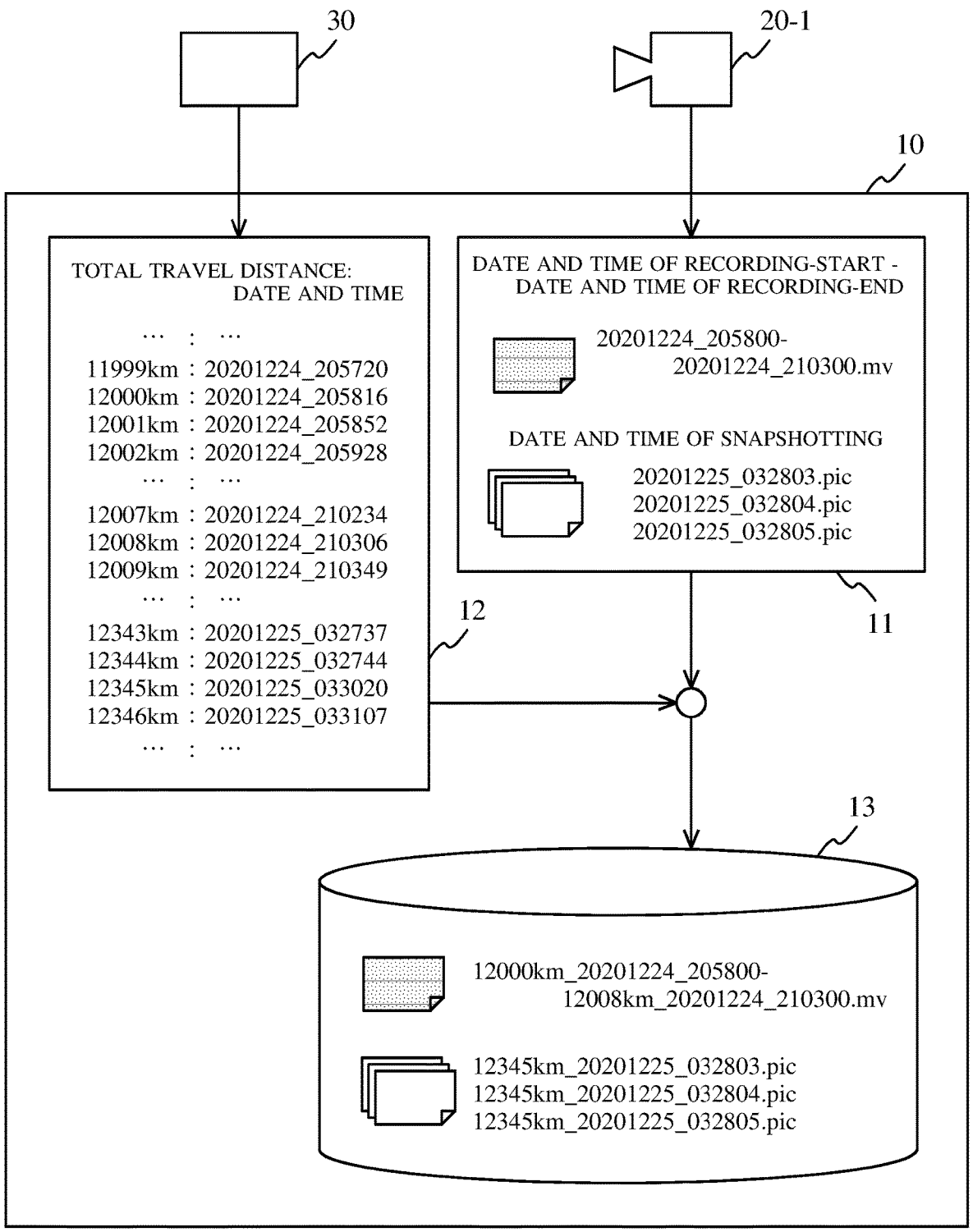
FIG. 2 is a diagram describing one example of an information associating process performed by the on-vehicle data management device according to the present embodiment.

Next, further with reference to FIG. 2, one example of an information associating process performed by the on-vehicle data management device 10 according to the present embodiment is described. FIG. 2 shows an example of a data structure of a data file. In this data structure, from among images of the vicinity of the vehicle taken and recorded by a first apparatus 20-1 such as an on-vehicle camera, some images recorded in accordance with occurrence of a predetermined event are collected as the target data, and this collected target data is caused to be associated with the total travel distance of the vehicle obtained from the second apparatus 30 such as a meter ECU, as the information related to travel of the vehicle.

The data collection section 11 collects, as the target data, image files recorded in accordance with occurrence of a predetermined event from among image files recorded in the first apparatus 20-1.

In the example shown in FIG. 2, the data collection section 11 collects, as the target data, a moving image file "20201224_205800-20201224_210300.mv" which was recorded from 20 hours 58 minutes 00 seconds to 21 hours 03 minutes 00 seconds on Dec. 24, 2020 in accordance with occurrence of a predetermined event during travel of the vehicle, and still image files "20201225_032803.pic", "20201225_032804.pic", and "20201225_032805.pic" which were respectively recorded at 03 hours 28 minutes 03 seconds, 03 hours 28 minutes 04 seconds, and 03 hours 28 minutes 05 seconds on Dec. 25, 2020 in accordance with occurrence of a predetermined event during stop of the vehicle.

The target data collected by the data collection section 11 may be deleted from the record region of the first apparatus 20-1. Then, the first apparatus 20-1 becomes able to record many new images.

The information obtaining section 12 obtains, from the second apparatus 30, distance information in which the total travel distance of the vehicle is associated with the date and time at which the total travel distance was reached.

In the example shown in FIG. 2, the information obtaining section 12 obtains date and time that corresponds to each unit of 1 km of the total travel distance. For example, "11999:20201224_205720" indicates that the date and time at which the total travel distance reached 11999 km was 20 hours 57 minutes 20 seconds of Dec. 24, 2020. The unit of the total travel distance is not limited to 1 km, and can be set as desired in accordance with the purpose for which the data is utilized.

The information obtaining section 12 may obtain only the total travel distance of the vehicle from the second apparatus 30 and provide a date and a time that corresponds thereto. In this case, the date and time may be obtained, for example, through a clock function (not shown) built in the on-vehicle data management device 10, or may be obtained from Global Positioning System Time obtained by a GPS receiver (not shown) connected to the network 40.

The storage processing section 13 stores the target data collected by the data collection section 11 in association with the total travel distance obtained by the information obtaining section 12. More specifically, the storage processing section 13 searches for a date and a time of obtainment of the distance information in the information obtaining section 12, using the date and time of recording of the target data as a key, and specifies a total travel distance with respect to which the date and time of the obtainment and the date and time of the recording match or are close to each other. Then, the specified total travel distance is caused to be associated with the target data.

In the example shown in FIG. 2, the storage processing section 13 specifies 12000 km at 20 hours 58 minutes 16 seconds which is after the date and time of recording-start of the moving image file "20201224_205800-20201224_210300.mv", and specifies 12008 km at 21 hours 03 minutes 06 seconds which is after the date and time of recording-end. Then, the storage processing section 13 provides (embeds) the specified total travel distance as a part of the file name of the moving image file, as in "12000 km 20201224_205800-12008km_20201224_210300.mv", for example. In addition, the storage processing section 13 specifies 12345 km at 03 hours 30 minutes 20 seconds on Dec. 25, 2020, which is after the date and time of snapshotting of each of the three still image files "20201225_032803.pic", "20201225_032804.pic", and "20201225_032805.pic". Then, the storage processing section 13 provides (embeds) the specified total travel distance as a part of the file name of the still image file, as in "12345km_20201225_032803.pic", "12345km_20201225_032804.pic", and "12345km_20201225_032805.pic", for example.

The specified total travel distance can also be added to a predetermined extended region (for example, Exif information of Jpeg), other than being provided to (embedded in) a part of the file name of an image file.

[Example of Utilization of Data]

Next, described is an example in which various types of data having information associated therewith by the on-vehicle data management device 10 according to the present embodiment is utilized by an information management center (not shown) or the like outside the vehicle. The information management center extracts necessary data from among a plurality of pieces of data stored in the storage processing section 13.

(1) Image data corresponding to a certain travel distance interval (for example, 1 km interval) is extracted. Accordingly, compared with a case where image data corresponding to a certain time interval is extracted, redundant extraction of the same image data during stop of the vehicle can be avoided, and lack of necessary image data during high-speed travel can be avoided. Thus, the data can be appropriately utilized.

(2) Only a plurality of pieces of image data having the same total travel distance are extracted. Accordingly, more detailed image data than that in the case of a certain travel distance interval can be extracted. Thus, such images can be utilized in confirming images (signs, billboards, etc.) at an intersection or the like during stop of the vehicle, for example.

(3) Only a plurality of pieces of image data having different total travel distances are extracted. Accordingly, images that are changing every moment in the route being travelled by the vehicle can be obtained. Thus, these images can be utilized in confirming the state of the travel route (maintenance or guidance) or the like, for example.

(4) Image data during EV travel is extracted. Such travel mode data can be utilized in analysis or the like of causes of an event that has occurred.

(5) Drive mode data indicating whether the drive is automatic drive or manual drive in a specific event is extracted. Such drive mode data can be utilized in analysis or the like of an event that has occurred.

[Effects]

As described above, the on-vehicle data management device 10 according to one embodiment of the present invention collects data from record regions of the first apparatuses 20-1 to 20-n, and stores the collected target data in association with information related to travel of the vehicle obtained from the second apparatus 30. Accordingly, if the storage processing section 13 of the on-vehicle data management device 10 is searched using the information related to travel of the vehicle as a key, desired target data can be easily extracted, and thus, data can be efficiently utilized. Since each of the first apparatuses 20-1 to 20-n need not newly obtain information related to travel of the vehicle and need not associate the obtained information with target data, it is advantageous in that the existing first apparatuses 20-1 to 20-n can be used without performing update or the like of programs.

The present invention can be implemented not only as an on-vehicle data management device but also as a data management method performed by the on-vehicle data management device. The data structure of the data file of the storage processing section 13 is useful in terms of utilization of data.

While the present invention has been described in detail, the foregoing description is in all aspects illustrative and not restrictive. It is understood that numerous other modifications and variations can be devised without departing from the scope of the present invention.

What is claimed is:

1. An on-vehicle data management device comprising:
   a data collection section configured to collect target data from among a plurality of pieces of data that are obtained by a first apparatus of a vehicle, the first apparatus comprising a first sensor configured to obtain the target data, the first sensor being mounted to the vehicle;
   an information obtaining section configured to obtain information related to travel of the vehicle from a second apparatus of the vehicle, the second apparatus comprising a second sensor configured to obtain the information related to travel of the vehicle, the second sensor being mounted to the vehicle; and
   a storage processing section configured to store the target data collected by the data collection section in association with the information related to travel of the vehicle obtained by the information obtaining section, wherein
   the information related to travel of the vehicle is embedded into a part of a file name of the target data and/or added to a predetermined extended region of the target data, and
   in a case where the vehicle is traveling in an automatic drive mode, the information related to travel of the vehicle is a level of an automatic drive being performed by the vehicle.

2. The on-vehicle data management device according to claim 1, wherein
   the information related to travel of the vehicle is a total travel distance of the vehicle.

3. The on-vehicle data management device according to claim 1, wherein
   the information related to travel of the vehicle is a position of the vehicle.

4. The on-vehicle data management device according to claim 1, wherein
   in a case where the vehicle is a hybrid vehicle, the information related to travel of the vehicle is a travel mode indicating whether the vehicle is traveling in an EV travel mode or in an engine travel mode.

5. The on-vehicle data management device according to claim 1, wherein
   in a case where the vehicle has an automatic drive function, the information related to travel of the vehicle is a drive mode indicating whether the vehicle is traveling in a manual drive mode or in an automatic drive mode.

6. A data management method performed by a computer device mounted on a vehicle, the data management method comprising:
   a collection step of collecting target data from among a plurality of pieces of data that are obtained by a first apparatus of a vehicle, the first apparatus comprising a first sensor configured to obtain the target data, the first sensor being mounted to the vehicle;
   an obtainment step of obtaining information related to travel of the vehicle from a second apparatus of the vehicle, the second apparatus comprising a second sensor configured to obtain the information related to travel of the vehicle, the second sensor being mounted to the vehicle; and
   a step of storing the target data collected in the collection step, into a storage section, in association with the information related to travel of the vehicle obtained in the obtainment step, wherein
   the information related to travel of the vehicle is embedded into a part of a file name of the target data and/or added to a predetermined extended region of the target data, and
   in a case where the vehicle is traveling in an automatic drive mode, the information related to travel of the vehicle is a level of an automatic drive being performed by the vehicle.

7. A non-transitory computer readable medium storing a program causing a processor to execute a process, the process comprising:
   collecting target data from among a plurality of pieces of data that are obtained by a first apparatus of a vehicle, the first apparatus comprising a first sensor configured to obtain the target data, the first sensor being mounted to the vehicle;
   obtaining information related to travel of the vehicle from a second apparatus of the vehicle, the second apparatus comprising a second sensor configured to obtain the information related to travel of the vehicle, the second sensor being mounted to the vehicle; and
   storing the target data, into a storage section, in association with the information related to travel of the vehicle, wherein
   the information related to travel of the vehicle is embedded into a part of a file name of the target data and/or added to a predetermined extended region of the target data, and
   in a case where the vehicle is traveling in an automatic drive mode, the information related to travel of the vehicle is a level of an automatic drive being performed by the vehicle.

* * * * *